United States Patent Office 3,814,632
Patented June 4, 1974

3,814,632
BATTERY AND METHOD OF MANUFACTURING THE SAME
Shiro Miyagawa, Suita, Osaka, Japan, assignor to Miyagawa Kasei Industry Co., Ltd.
Filed Apr. 20, 1972, Ser. No. 245,735
Claims priority, application Japan, Apr. 20, 1971, 46/25,966; Mar. 7, 1972, 47/23,282
Int. Cl. H01m 5/00, 35/32
U.S. Cl. 136—134 R          13 Claims

ABSTRACT OF THE DISCLOSURE

A storage battery case of synthetic resin in prepared which has a plurality of partition walls for forming cells therein, each wall having a notch formed at its upper end portion. Into each notch is inserted a connector member so that opposite sides may face the respective cell. Then mold elements are brought into a position near the connector member to form an enclosed space around the peripheral portion of the connector member. Synthetic resin is then injected into the space to form a seal member so that at least a portion of the sides of the connector member facing the cell may be exposed. Then into each cell is inserted an electrode plate assembly, which has an electrode rod extending upward from an end thereof up to the connector member. In the next step, the upper ends of both electrode rods of the adjacent assemblies are connected to the connector member by means of electrical welding, for example.

A battery case cover also made of synthetic resin is thermally bonded on the battery case so that each cell is isolated from each other. As a result a good liquid-tight effect of the connector extending through the partition wall in the battery is attainable with ease.

BACKGROUND OF THE INVENTRION

Field of the invention

This invention relates to a battery and a method of manufacturing the same. More particularly, this invention relates to a storage battery and a method of manufacturing the same in which adjacent electrode assemblies, each being introduced into individual cell formed by partition walls in a storage battery case, are connected to each other so that a connector portion therebetween extends through the partition walls in a preferred liquid-tight manner.

Description of the prior art

A typical storage battery includes a battery case in which a plurality of cells are formed by partition walls. Into each of these cells is introduced an electrode plate assembly, thus constituting a battery cell. The electrode plate assembly in one cell is connected with that in the adjacent cell by means of a connector. The connector is generally arranged to extend through the partition wall in order to reduce the height of a battery, make short a current path between adjacent battery cells for decreasing electric resistance and economize a material of the connector. In such a battery, however, a liquid-tight sealing condition must be maintained between the connector and the partition wall to dispense with leakage paths of electrolyte through the partition wall.

An improved method of manufacturing storage battery in which the abovementioned liquid-tight sealing condition between a connector and a partition wall is established is disclosed in British Patent, No. 1,228,104, "Method of Manufacturing a Battery Accumulator With Cell Connectors Which Pass Through the Walls Separating the Accumulator Cells," which was filed on May 6, 1969 and was published on May 15, 1971. This referenced patent teaches a method of manufacturing a battery with cell connectors extending through cell-separating walls, and more specifically discloses a method of manufacturing a battery in which a plurality of electrode plate assemblies connected to each other in advance with bridge and connector assemblies are inserted into a battery case made of synthetic resin so that each assembly may be introduced into a cell formed by the cell-separating walls and a liquid-tight sealing condition is then established between the bridge and connector assemblies and the cell-separating walls of the battery case by injection molding of synthetic resin. More specifically, a plurality of electrode plate assemblies, each being inserted into a cell separated by cell-separating walls, are connected to each other beforehand by the bridge and connector assemblies. An electrode block thus prepared which comprises such a plurality of electrode plate assemblies and bridge and connector assemblies is then inserted into the battery case made of synthetic resin so that each plate assembly is placed in a cell. Then, a space formed between the bridge and connector assemblies and the partition wall of the battery case is sealed in a liquid-tight manner by molding of synthetic resin. The method of manufacturing a battery disclosed in the referenced patent, however, presents difficulties in inserting the electrode block comprising a plurality of plate assemblies and bridge and connector assemblies between the partition walls of the battery case. Particularly, in case of production of large-sized battery, plate assemblies are also made larger in size and weight and the bridge and connector assemblies are also rendered so correspondingly, thus making the inserting work more difficult. In addition, no consideration has been given to the mechanical strength of the liquid-tight sealing portion between the bridge and connector assembly and the partition wall according to the method of production of the referenced patent. That is, the battery manufactured by the method of the referenced patent offers possibilities that application of mechanical strength to the liquid-tight sealing portion of the bridge and connector assembly may cause leakage of electrolyte in practical use. Furthermore, no consideration has been given to the easiness of preparation for molds for liquid-tight sealing according to the method in the referenced patent.

SUMMARY OF THE INVENTION

In accordance with this invention, a storage battery case of synthetic resin, in which a plurality of cells are formed by partition or separating walls, is first prepared, each partition wall having therein a notch or opening portion through which a connector as will be described later is to be set. Then, the connector, prepared in advance, is fitted through said notch or opening, this followed by forming a seal member of synthetic resin through a molding step around the outer periphery of said connector in such a manner that a liquid-tight sealing condition is established between two adjacent cell rooms. Since, as will be described later, said connector is connected to an electrode rod of the electrode plate assembly in a subsequent step, said seal is formed in such a manner that a middle portion facing the cell room of the connector may be exposed. In a preferred embodiment of the present invention the top of all the wall of the case, including separating walls, is made flat so as to facilitate liquid-tight closing of the individual cell rooms by fitting a battery case cover onto the ease and also to facilitate the molding step.

Then, the electrode plate assembly is introduced into each cell room of said battery case, said electrode plate assembly provided with an electrode rod for connection with said exposed portion of the connector. This electrode rod is so arranged that it faces said exposed portion of said connector when said electrode plate assembly has been introduced into the cell room. Thus, the electrode plate assembly introduced into the cell room is so positioned that the electrode rod may be connected with said exposed portion of the connector with ease.

Then, the electrode rod is electrically connected with said exposed portion of the connector by welding or some other suitable method. As a result, a pair of adjacent electrode plate assemblies are electrically connected to the common connector positioned therebetween. Said electrical connection of the electrode rods to the connector may be accomplished concurrently in both sides or sequentially in different steps one side by one side. In case the seal member formed before introduction of the electrode assembly into the case makes it difficult to introduce the assembly due to the increased thickness of the seal member, the fitting of the connector into the notch and formation of the seal member may be carried out after the electrode assembly is introduced into the case. With the electrode rod and the connector thus connected electrically, a battery case cover, also of synthetic resin, is attached to the top of the battery case to complete a battery.

In a preferred embodiment of the present invention, a mold for use in the molding process comprises paired mold elements for sandwiching the wall and the connector so as to enclose a portion to be molded. As a result the mold is simple in structure and easy to make.

Therefore, an object of this invention is to provide an improve method of manufacturing a battery which requires only easy work.

Another object of this invention is to provide a method of manufacturing a battery in which the liquid-tight effect of sealed portion of a connector traversing the partition wall is further assured.

A further object of this invention is to provide a method of manufacturing a battery in which the mechanical strength of the sealed portion of a connector traversing the partition wall is further increased.

Still a further object of this invention is to provide a method of manufacturing a battery in which a molding mold for sealing a connector portion traversing the partition wall is made easier to make.

It is a further object of this invention to provide an improved battery having a good liquid-tight seal effect of a connector portion extending through the partition wall in the battery case.

It is still a further object of this invention to provide an improved battery having a simplified structure for performing a good liquid-tight seal effect of a connector portion extending through the partition wall in the battery case.

These objects and other objects and features of the present invention will become apparent from the following detailed description of the preferred embodiments taken in conjunction with the accompanying drawings.

DESCRIPTION OF THE PREFERRED EMBODIMENTS

Figure 1:
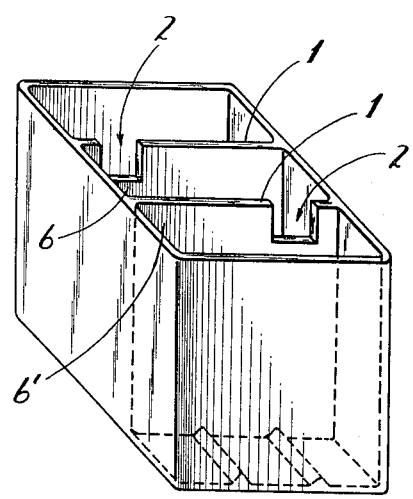
FIG. 1 is a perspective view of a battery case for use in an embodiment of the present invention.

According to the method of manufacturing a battery of the present invention, the first step of the manufacturing process comprises preparation of a battery case, as shown in FIG. 1. This battery case is made of synthetic resin such as polypropylene and is provided with separating walls 1 therein for dividing the inside of the case into a plurality of cell rooms 6 and 6'. On the separating wall 1 a notch 2 is formed where a connector to be described is secured to said wall.

Figure 2:
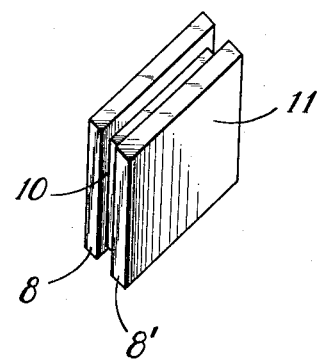
FIG. 2 is a perspective view of a connector to be inserted through a notch provided on the partition wall of the battery case shown in FIG. 1.
Figure 3:
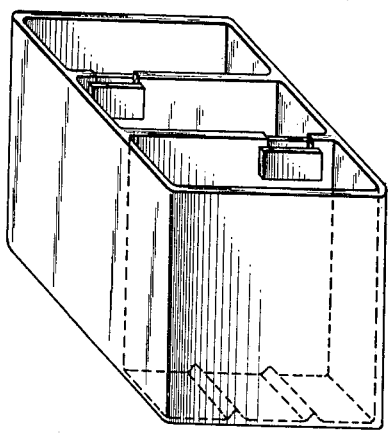
FIG. 3 is a perspective view of the battery case similar to FIG. 1, wherein the connector has been inserted to the notch of the partition wall.
Figure 4:
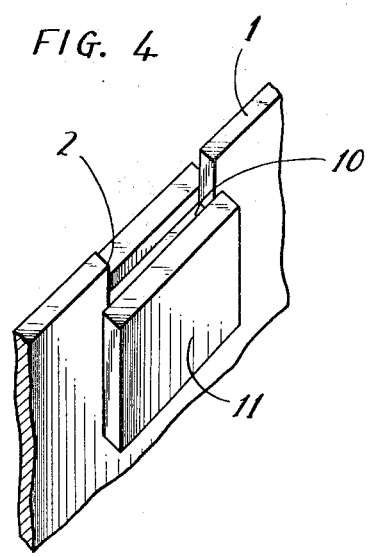
FIG. 4 is an enlarged perspective view of a portion of the partition wall in the vicinity of the connector shown in FIG. 3.

In the second step is prepared a rectangular plate-like connector 11, as shown in FIG. 2, which is slightly larger than the size of the notch 2 and has grooves 10 formed extending along the center of all peripheral surfaces, leaving two narrow strips 8, 8' on both sides of the groove, these grooves being so dimensioned as to match and receive the wall portion around said notch 2. The connector 11 is inserted in the notch 2 of the separating wall 1 in such a manner that the wall portion around the notch fits in the grooves 10 of the connector. FIG. 3 is a perspective view of the case, in which the connector has been positioned in the notch, as described above, and FIG. 4 is an enlarged perspective view of the connector and a portion of the separating wall in the vicinity thereof. As mentioned above, the grooves 10 formed on the peripheral surfaces of the connector 11 are so dimensioned as to receive the wall portion around the notch 2 tightly therein as the connector 11 is set in the notch 2 of said separating wall, this ensuring precise positioning of the connector as it is set or mounted and also ensuring an improved liquid-tight sealing, as will be described later on.

In the third step, mold elements for forming a mold assembly (not shown) are guided from both sides of the separating wall 1 in such a manner that the peripheral portions of the connector 11 are enclosed thereby so as to provide a certain clearance or space between the mold elements and the wall and the connector, while the top opening of the enclosed space thus formed is closed. Then, said enclosed space formed by the mold so positioned is filled with synthetic resin by injection molding for formation of a seal member 5 (FIG. 6).

Figure 5:
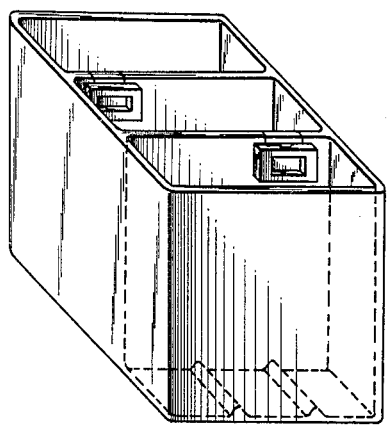
FIG. 5 is a similar perspective view of the battery case shown in FIG. 1, wherein a seal member has been formed by a molding process so that the peripheral portion of the connector may be sealed, leaving the central portion of the side surfaces exposed to the respective cell.
Figure 6:
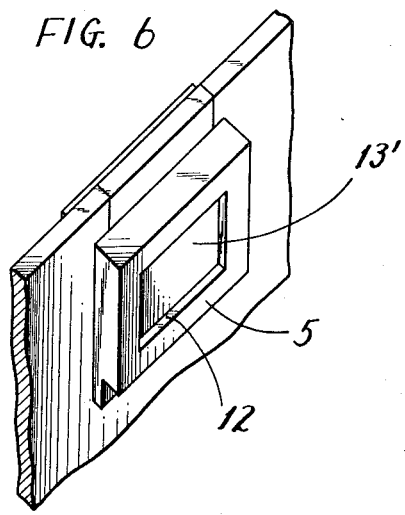
FIG. 6 is an enlarged perspective view of a portion of the partition wall in the vicinity of the connector shown in FIG. 5.

A perspective view of the case, as processed by the molding step is shown in FIG. 5, while an enlarged perspective view of the connector and its vicinity is shown in FIG. 6. It is important that this seal member 5 has a window 12 so that the central portions 13 and 13' of the connector 11 are exposed therethrough. Though the mold required for molding process of the seal member 5 in such a form is not shown, the structure of the mold required, or geometry of the inner surface of the mold, will be apparent from the external form of the connector 11 and the seal member 5. In the fourth step said electrode plate assembly 41 having electrode rod 3 extending upward is inserted in the cell room of said battery case and so positioned therein that the electrode rod 3 of the electrode plate assembly 41 faces the exposed portion 13 of said connector 11. Also in the adjacent cell room another electrode plate assembly 41 having electrode rod 3' extending upward is inserted so as to be positioned likewise, so that the electrode rod 3' of the electrode plate assembly 41 faces the exposed portion 13' of the connector 11.

Figure 7:
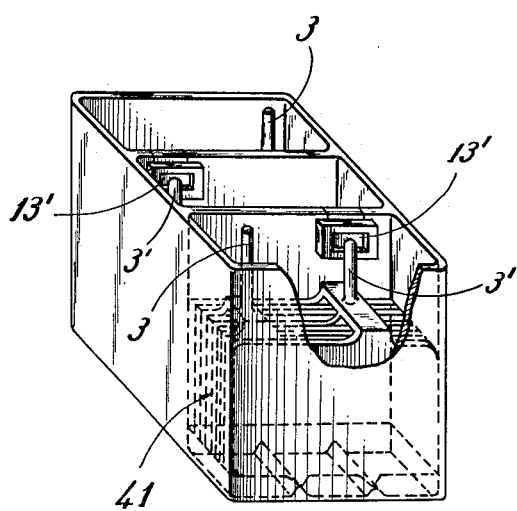
FIG. 7 is a perspective view of the battery case similar to that shown in FIG. 5, wherein electrode plate assemblies have been introduced into the respective cells and electrode rods have been connected to the exposed portion of the connector.
Figure 8:
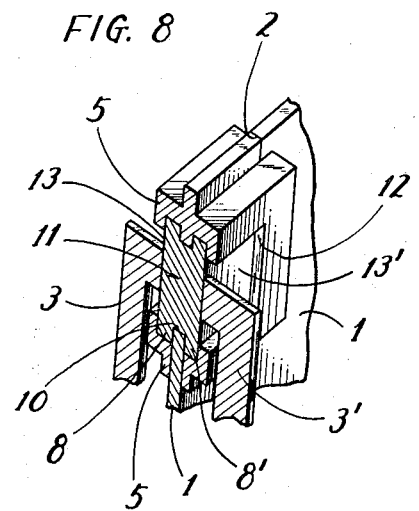
FIG. 8 is an enlarged perspective and sectional view of a portion of the partition wall in the vicinity of the connector shown in FIG. 7.

In the fifth step the electrode rods 3 and 3' of the electrode plate assemblies are connected with the parts 13 and 13' of the connector 11 either by welding or soldering, this procedure being well known to those skilled in the art. A battery case as completed in accordance with the process in accordance with the present invention is shown in FIG. 7. An enlarged perspective and sectional view of a portion of the partition wall in the vicinity of the connector shown in FIG. 7 is shown in FIG. 8.

In the final step, a battery case cover (not shown) consisting of materials which are the same as or similar to those of the battery case is fixed to the upper surface of the battery case, typically, by thermal bonding. The thermal bonding of the battery case cover is well known to those skilled in the art.

For example, when the battery case is composed of polypropyrene and the sealing member 5 is also composed of polypropyrene, it has been found that both members show a good adhesion through heating caused by the molding process, resulting in a desirable liquid-tight effect or sealing effect. As materials for the sealing member 5, however, other suitable thermoplastic materials may advantageously be used, if they are of good electrical insulation, good acid resistance and close adhesion to materials of battery case after molding. In addition, for example, adhesives of hot melt type can also be advantageously used for this purpose. As methods of molding, cast molding can be employed in addition to the injection molding which will be described later.

It will be apparent from the above description that the seal member 5 effects secure fixing of the connector 11 to the separating wall 1, while serving effectively to seal the portion of the separating wall 1 where the connector 11 extends therethrough. Particularly in accordance with the embodiment shown in FIGS. 1 through 8, a battery case has a notch 2 formed in the separating wall 1 and in this notch 2 is fitted a connector 11 having grooves 10 on all peripheral surfaces thereof, so dimensioned that the wall portion around the notch 2 fits tightly therein, in such a manner that the wall portion around the notch 2 is received in said grooves 10, followed by formation of a seal member 5 by the molding process in such a manner that the portions of the connector 11 facing each cell room are exposed, thereby establishing the sealing effect between the connector 11 and the separating wall 1, and thus between any two adjacent cell rooms.

Figure 9:
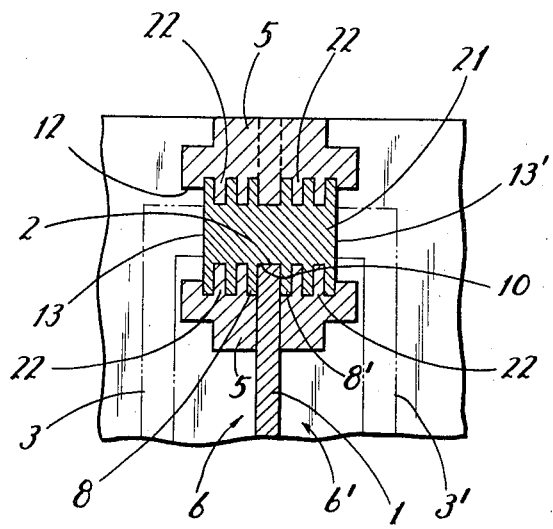
FIG. 9 is a sectional view of a connector portion of a battery in accordance with another embodiment of the present invention, taken in a plane normal to the separating wall.

FIG. 9 is a sectional view of a connector portion of a battery in accordance with another embodiment of the present invention, taken in a plane normal to the separating wall. The embodiment shown in FIG. 9 comprises a connector 21 thicker than those of the embodiments described and shown in FIGS. 1 through 8 and having on the outer surface the groove 10, as described previously, and also grooves 22. The seal member 5 is formed accordingly to fill those grooves 22, resulting in a longer interface formed between the seal member 5 and the connector 21 and thus a further improvement of the sealing effect.

Figure 10:
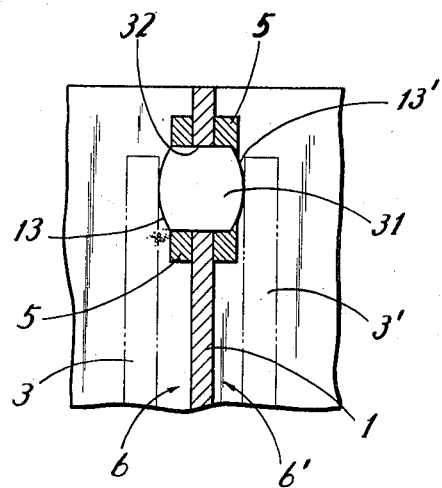
FIG. 10 is a sectional view of a connector portion of a battery in accordance with a further embodiment of the present invention, taken in a plane normal to the separating wall.

In FIG. 10 is shown a sectional view of a connector portion of a battery in accordance with a further embodiment of the present invention, taken in a plane normal to the separating wall. In the embodiment shown in FIG. 10, there is provided a circular opening 32 in the separating wall 1 instead of the rectangular notch 2 in the embodiment shown in FIGS. 1 through 8. This embodiment comprises a rod-like connector 31 having projecting spherical surfaces on both sides. Employment of this connector 31 facilitates welding of said projecting portions with the electrode rods 3 and 3'. Further advantages of this type of connector are that, when said connection is accomplished by electric resistance welding, the loss of heat is smaller, that there is no risk of the seal member being molten by heat and that welding can be accomplished securely and easily. The seal member 5 is then formed as a function of the space defined by said rod-like connector 31, the partition wall 1 and the mold assembly. Straight electrode rods 3 and 3' are either welded or soldered to both spherical projected portions of the surface of the connector 31. It is noted that the connector 31 of the embodiment has no such flanges 8 and 8' as shown in FIG. 8. Accordingly, this embodiment enables the connector 31 to be simply set by sideways insertion thereof through the opening 32, this followed by molding of the seal member 5. It is understood that as this molding is performed the connector 31 is accurately positioned with respect to the separating wall 1 by means of the mold. Though the present embodiment has been described above as employing the circular opening and thus the cylindrical connector, these may as well be of any other form such as a square.

It is understood that the seal member which has been formed before insertion of the electrode assembly into the battery case is liable to make it difficult to introduce the assembly into the case due to the increased thickness of the seal member even in such an embodiment as employing a thin connector. It is also understood that this will be aggravated by employment of such a longer or thicker connector, as shown in FIGS. 9 and 10. In order to avoid such difficulty the fitting of the connector into the notch and formation of the seal member may be carried out after the electrode assembly is introduced into the case. It is pointed out that the present invention also comprises such an embodiment.

As described above, the present invention features its simplicity and the possibility of setting the connector across the separating wall with an improved liquid-tight sealing effect. Hence employment of the present invention enables mass-production of batteries with minimized risk of electrolyte leakage through the partition wall and uniformity in quality as well as saving of labor.

While specific preferred embodiments of the present invention have been described, it will be apparent that obvious variations and modifications of the invention will occur to those of ordinary skill in the art from a consideration of the foregoing description. It is, therefore, desired that the present invention be limited only by the appended claims.

What is claimed is:

1. A battery comprising:
    a battery case made of a thermoplastic resin and having at least one partition wall disposed therein for forming a plurality of cells, said partition wall having an opening formed in the upper end portion thereof,
    a metal plate connector positioned in said opening in coplanar relationship with said partition wall such that the periphery of said metal plate connector is in contact with the inner surface of said opening and the opposite sides of said metal plate connector face adjacent cells,
    a sealing member made of a thermoplastic resin covering the whole peripheral portion of the metal plate connector and that portion of the partition wall in the vicinity of said opening whereby liquid leakage through said opening is prevented, the central portions of the opposite sides of said metal plate connector being left uncovered in order to provide electrical connection between adjacent cells,
    a plurality of electrode plate assemblies disposed in said individual cells,
    connecting means for electrically connecting the electrode assemblies of adjacent cells with the central exposed portions of said opposing sides of said metal plate connector, and a battery case cover made of a thermoplastic resin attached to the case for isolating the individual cells.

2. A battery in accordance with claim 1, wherein said metal plate connector includes means for positioning it with respect to the partition wall.

3. A battery in accordance with claim 1, wherein said metal plate connector contains a centrally disposed groove extending around the peripheral outer surface thereof for receiving that portion of the partition wall adjacent the opening in said partition wall.

4. A battery in accordance with claim 3, wherein the groove in said metal plate connector corresponds to the opening in said partition wall so that when said metal plate is in position in said opening the non-grooved sides and bottom portions thereof extend beyond said opening and overlap the partition wall in the vicinity of said opening.

5. A battery in accordance with claim 1, wherein said metal plate connector comprises a groove extending along the entire periphery thereof for increasing the interface formed between said plate connector and said sealing member, whereby a liquid-tight sealing of the metal plate connector is achieved.

6. A battery in accordance with claim 1, wherein said central exposed portions of the opposing sides of the metal plate connector protrude beyond the surface of the sealing member to connect with the respective end of the connecting means.

7. A battery in accordance with claim 1, wherein said metal plate connector contains a plurality of grooves extending around the peripheral outer surface thereof, the most centrally disposed grooves corresponding to the opening in said partition wall so that when said metal plate connector is in position in said opening, the non-grooved sides and bottom portions of said centrally disposed groove extend beyond said opening and overlap the partition wall.

8. A battery in accordance with claim 7, wherein said plurality of grooves extend a short distance into adjacent cells, thereby increasing the interface formed between said metal plate connector and said sealing member, whereby a liquid-tight sealing of the metal plate is achieved.

9. A method of manufacturing a battery comprising a battery case made of a thermoplastic resin having at least one partition wall disposed therein for forming a plurality of cells, a plurality of electrode plate assemblies inserted into said plurality of cells for forming a plurality of battery cells and means for connecting electrode plate assemblies in the adjacents cells through said partition wall in a liquid-tight manner, said method comprising the steps of:
preparing said battery case of a thermoplastic resin having at least one partition wall therein for forming a plurality of cells, said wall having an opening formed in the upper end portion thereof, positioning a metal plate connector in said opening in a coplanar relationship with said partition wall such that the periphery of said metal plate connector is in contact with the inner surface of said opening and the opposite sides of the metal plate connector face adjacent cells,
molding a seal member made of a thermoplastic resin around the metal plate connector so that the whole peripheral portion of the metal plate connector and the wall portion in the vicinity of said opening are in sealing engagement with the seal member while the central portions of the opposite sides of the metal plate connector are left uncovered in order to provide electrical connection between adjacent cells, said seal member preventing liquid leakage through said opening and establishing a liquid-type seal condition between said adjacent cells, and
electrically connecting the electrode plate assemblies in adjacent cells by placing connecting rods extending from said electrode plate assemblies into contact with the central exposed portions of the opposite sides of the metal plate connector.

10. A method of manufacturing a battery in accordance with claim 9, which further comprises the step of inserting said electrode plate assemblies into individual cells after said step of molding said seal member.

11. A method of manufacturing a battery in accordance with claim 9, which further comprises the step of inserting said electrode plate assemblies into individual cells before said step of molding said seal member.

12. A method of manufacturing a battery in accordance with claim 9, wherein said opening in said partition wall contains an opened upper end and the step of positioning the metal plate connector comprises bringing said connector through said opened upper end into said opening in said partition wall in a direction parallel to said wall.

13. A method of manufacturing a battery in accordance with claim 9, wherein said opening comprises an aperture, and the step of positioning the metal plate connector member comprises bringing said connector to said opening in a direction normal to said partition wall.

References Cited
UNITED STATES PATENTS

| | | | |
|---|---|---|---|
| 3,253,962 | 5/1966 | Deprill et al. | 136—134 R |
| 3,692,587 | 9/1972 | Vetor et al. | 136—134 R |
| 1,721,293 | 7/1929 | Callender | 136—134 |
| 3,441,448 | 4/1969 | Hayward et al. | 136—176 |
| 3,615,864 | 10/1971 | Consolloy | 136—134 R |
| 3,386,860 | 6/1968 | Maier | 136—176 |
| 3,627,587 | 12/1971 | Lindenberg et al. | 136—166 |
| 3,663,305 | 5/1972 | Lindenberg | 136—176 |

ANTHONY SKAPARS, Primary Examiner

U.S. Cl. X.R.

136—176